(12) United States Patent
Kulkarni et al.

(10) Patent No.: US 11,059,416 B1
(45) Date of Patent: Jul. 13, 2021

(54) ELECTROCHROMIC ADAPTIVE DRIVING BEAM SYSTEM AND METHOD

(71) Applicant: Grote Industries, LLC, Madison, IN (US)

(72) Inventors: Suyash Kulkarni, Madison, IN (US); Sankalp Pampattiwar, Madison, IN (US); Brian Norris, Madison, IN (US); Cesar Perez-Bolivar, Madison, IN (US)

(73) Assignee: Grote Industries, LLC, Madison, IN (US)

( * ) Notice: Subject to any disclaimer, the term of this patent is extended or adjusted under 35 U.S.C. 154(b) by 0 days.

(21) Appl. No.: 16/822,157

(22) Filed: Mar. 18, 2020

(51) Int. Cl.
*B60Q 1/08* (2006.01)
*B60Q 1/076* (2006.01)
*B60Q 1/14* (2006.01)
*B60Q 1/00* (2006.01)
*F21S 41/64* (2018.01)

(52) U.S. Cl.
CPC .......... *B60Q 1/085* (2013.01); *B60Q 1/0023* (2013.01); *B60Q 1/076* (2013.01); *B60Q 1/1438* (2013.01); *F21S 41/645* (2018.01); *B60Q 2300/054* (2013.01)

(58) Field of Classification Search
CPC ...... B60Q 1/085; B60Q 1/0023; B60Q 1/076; B60Q 1/1438; B60Q 2300/54; F21S 41/645
See application file for complete search history.

(56) References Cited

U.S. PATENT DOCUMENTS

2004/0145905 A1* 7/2004 Strazzanti ............ B60Q 1/1438 362/510
2014/0328078 A1* 11/2014 Williams .............. F21S 41/645 362/512

* cited by examiner

*Primary Examiner* — Henry Luong
(74) *Attorney, Agent, or Firm* — Posz Law Group, PLC (57) ABSTRACT

An electrochromic adaptive driving beam system for a vehicle includes a vehicle headlamp, a high-beam light source, and a low-beam light source. The vehicle headlamp includes an electrochromic material that covers the high-beam light source attached to the vehicle headlamp. The low-beam light source is uncovered by the electrochromic material of the vehicle headlamp. The electrochromic material is transparent to transmit light projected from the high-beam light source and changes opacity to reduce glare projected from the high-beam light source through the vehicle headlamp in response to a voltage.

13 Claims, 10 Drawing Sheets

ELECTROCHROMIC ADAPTIVE DRIVING BEAM SYSTEM AND METHOD

TECHNICAL FIELD

The subject matter described below relates generally to an adaptive driving beam system and method. More particularly, the described subject matter relates to an electrochromic adaptive driving beam system and method in which an electrochromic material of a vehicle headlamp changes opacity to reduce glare projected from a high-beam light source of the vehicle headlamp.

BACKGROUND

Vehicle headlamps generally include high beams and low beams for driving. High beams have a higher intensity (and appear brighter) than low beams, and thus allow a driver to see a larger area in the driver's field of view during poor lighting conditions (e.g., at night or during hazardous driving conditions). While high beams are helpful to the driver, high beams may present problems to other drivers and pedestrians.

For example, high beams are typically too bright to be used when other vehicles are present around the vehicle. This is because high beams produce glare that affects the drivers of other vehicles. In the industry, the effect from the glare projected from high beams is referred to as a dazzling effect. The glare from high beams may, e.g., dazzle oncoming traffic or dazzle other drivers from the reflection through a rear view mirror.

The glare produced by high beams presents problems to other drivers to such an extent that some drivers refrain from turning on their high beams due to a constant need to manually switch between high beams and low beams, especially when a driver's attention is needed for operation of the vehicle during poor lighting conditions. This causes some drivers not to use high beams in conditions that may otherwise warrant high beams.

Problems associated with the glare projected by high beams and the associated dazzling effect on other drivers and people remain, and there is room for improvement of headlamps that include high beams.

SUMMARY

Accordingly, one or more embodiments provide an electrochromic adaptive driving beam system for a vehicle that includes a vehicle headlamp, a high-beam light source, and a low-beam light source. The vehicle headlamp includes a base, a cover lens attached to the base, and an electrochromic material. The high-beam light source is attached to the base of the vehicle headlamp, housed within the cover lens, and covered by the electrochromic material of the vehicle headlamp. The low-beam light source is attached to the base of the vehicle headlamp, housed within the cover lens, and uncovered by the electrochromic material of the vehicle headlamp. The electrochromic material of the vehicle headlamp is transparent to transmit light projected from the high-beam light source and changes opacity to reduce glare projected from the high-beam light source through the vehicle headlamp in response to a voltage.

The electrochromic material may in one or more embodiments include a plurality of electrochromic sections that each change opacity independently from each other. The electrochromic adaptive driving beam may in one or more embodiments further include one or more sensors configured to detect an object in front of the vehicle headlamp and output a detection signal, and a controller configured to apply the voltage to the electrochromic material in one or more of the plurality of electrochromic sections in response to receiving the detection signal from the one or more sensors.

The electrochromic material may in one or more embodiments coat a surface of the cover lens of the vehicle headlamp.

The high-beam light source may in one or more embodiments include a high beam lens located between the cover lens and the base of the vehicle headlamp. The electrochromic material may in one or more embodiments coat a surface of the high beam lens of the high-beam light source. The high beam lens of the high-beam light source may in one or more embodiments be formed of the electrochromic material. In one or more embodiments, the electrochromic adaptive driving system may further include an electrochromic cover that includes the electrochromic material, and the electrochromic cover may attach to a surface of the high beam lens of the high-beam light source.

The cover lens of the vehicle headlamp may in one or more embodiments be formed of the electrochromic material.

The electrochromic adaptive driving system may in one or more embodiments further include an electrochromic cover that includes the electrochromic material, and the electrochromic cover may attach to a surface of the cover lens of the vehicle headlamp.

The electrochromic adaptive driving beam may in one or more embodiments further include an electrochromic cover that includes the electrochromic material, and the electrochromic cover may attach to the high-beam light source.

The electrochromic material may in one or more embodiments coat the high-beam light source.

The electrochromic adaptive driving beam system may in one or more embodiments further include one or more sensors configured to detect an object in front of the vehicle headlamp and output a detection signal, and a controller configured to apply the voltage to the electrochromic material in response to receiving the detection signal from the one or more sensors.

One or more embodiments provide a method of controlling an electrochromic adaptive driving beam vehicle headlamp that includes: turning on a high beam light source of a headlamp of a vehicle to project a high beam light pattern; detecting, via one or more sensors, an object in front of the vehicle; and applying a voltage to an electrochromic material of the headlamp to change an opacity of the electrochromic material and reduce glare of the high beam light pattern projected from the high beam light source of the headlamp.

The headlamp of the method may in one or more embodiments include a plurality of electrochromic sections that each include the electrochromic material. The method may in one or more embodiments further include selectively applying the voltage to the electrochromic material in one or more of the plurality of electrochromic sections of the headlamp. The method may in one or more embodiments further include determining a location of the object in front of the vehicle and selectively applying the voltage to the electrochromic material in one or more of the plurality of electrochromic sections of the headlamp corresponding to the location of the object.

BRIEF DESCRIPTION OF THE DRAWINGS

The accompanying figures where like reference numerals refer to identical or functionally similar elements and which together with the detailed description below are incorporated in and form part of the specification, serve to further illustrate an exemplary embodiment and to explain various principles and advantages in accordance with the present disclosure.

DETAILED DESCRIPTION

The instant disclosure is provided to further explain in an enabling fashion the best modes of performing one or more embodiments. The disclosure is further offered to enhance an understanding and appreciation for the inventive principles and advantages thereof, rather than to limit in any manner the embodiments.

It is further understood that the use of relational terms, such as first and second, if any, are used to distinguish one from another entity, item, or action without necessarily requiring or implying any actual such relationship or order between such entities, items or actions. Some embodiments may include a plurality of processes or steps, which can be performed in any order unless expressly and necessarily limited to a particular order (i.e., processes or steps that are not so limited may be performed in any order).

Figure 1:
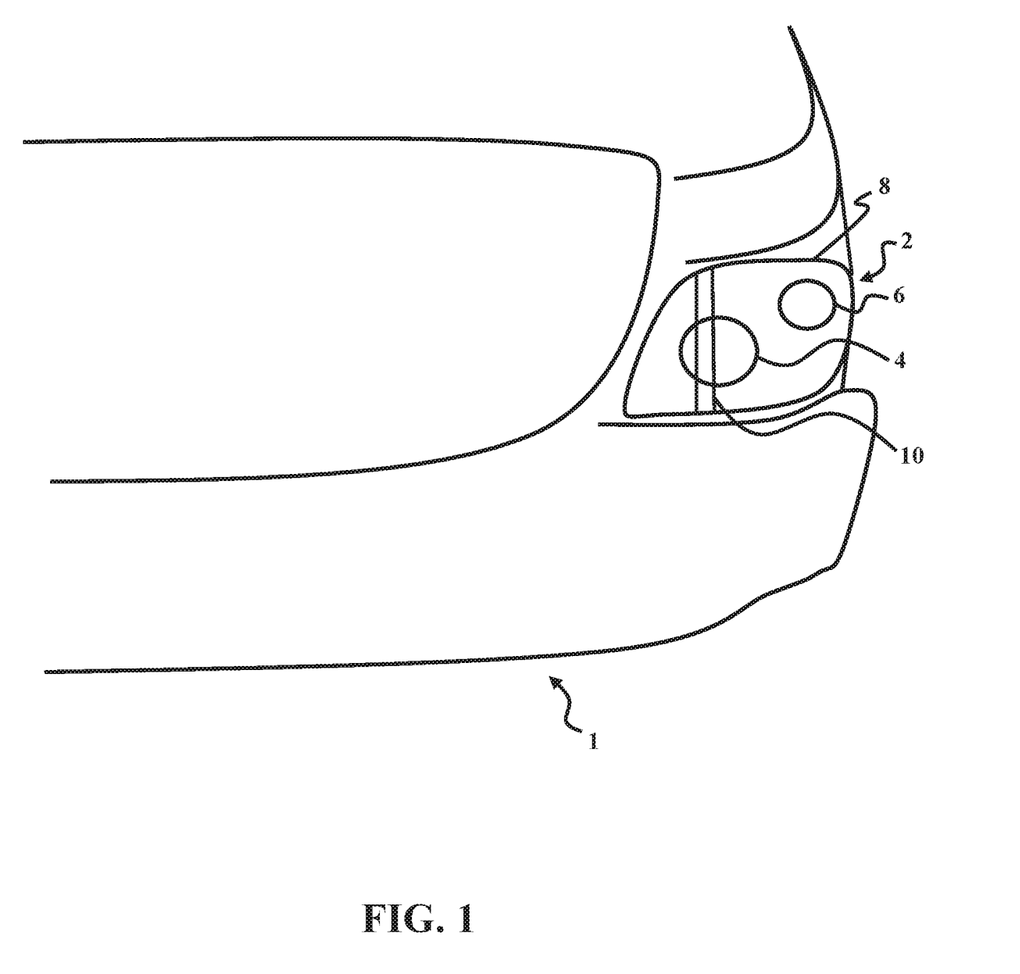
FIG. 1 is a simplified, schematic diagram of the electrochromic adaptive driving beam system in a vehicle according to disclosed embodiments.

FIG. 1 is a diagram of a vehicle 1 that includes an electrochromic adaptive driving beam system. The vehicle 1 as depicted in FIG. 1 is an automobile. However, the vehicle 1 may be other types of vehicles (e.g., boats, motorcycles, and recreational vehicles).

In FIG. 1, the vehicle 1 includes a vehicle headlamp 2. The vehicle headlamp 2 includes a high-beam light source 4 and a low-beam light source 6. The low-beam light source 6 produces low beams, and the high-beam light source 4 at least partially forms high beams. High beams are sometimes referred to as main beams, driving beams, or full beams. High beams may be formed by turning on a combination of the high-beam light source 4 and the low-beam light source 6. High beams have a greater luminescent intensity than low beams, and high beams are typically characterized by a light pattern with a greater intensity near the center with respect to the horizon. Low beams are sometimes referred to as dipped beams, since low beams are typically characterized by a light pattern that has a greater intensity below the horizon.

The high-beam light source 4 and the low-beam light source 6 may be one or more of any number of light sources. Examples of light sources include incandescent light bulbs, light-emitting diodes (LEDs), high-intensity discharge lamps, and laser lamps. The number, and combination of types, of light sources is not particularly limited.

As will be understood by one skilled in the art, the vehicle headlamp 2 may include any number of light sources for various optical purposes. For example, the vehicle headlamp 2 may include turn signals (sometimes referred to as blinkers or direction indicators), auxiliary lamps, fog lamps, spot lamps, search lamps, and/or daytime running lamps.

Returning to FIG. 1, the vehicle headlamp 2 also includes a cover lens 8. The cover lens 8 protects the interior optics of the vehicle headlamp 2, such as the high-beam light source 4 and the low-beam light source 6. The cover lens 8 also provides protections for other components of a vehicle headlamp 2, such as a reflector and optically active lenses that may be housed within the vehicle headlamp 2.

The vehicle headlamp 2 is a part of an electrochromic adaptive driving beam system. In the electrochromic adaptive driving beam system, an electrochromic material 10 is provided that is controllable to reduce the glare of the high beams projected by the high-beam light source 4. By controllable, the electrochromic material 10 changes opacity in response to a voltage. The voltage applied to the electrochromic material 10 may be referred to as an applied voltage or an electrochromic activation voltage.

The electrochromic material 10 is a material that exhibits electrochromism. A material that exhibits electrochromism will undergo a change in opacity, which may include a change in color in response to an applied voltage. Typically, a material that exhibits electrochromism will undergo such a change in response to a change in the electron structure of the underlying material. These materials may be types of chromophores. Examples include tungsten oxide, molybdenum, titanium oxides, niobium oxides, and viologens. The particular type of electrochromic material 10 in the electrochromic adaptive driving beam system is not particularly limited.

The electrochromic material 10 in FIG. 1 is formed in front of the high-beam light source 4. The electrochromic adaptive driving beam system applies a voltage to the electrochromic material 10 in order to change the opacity of the electrochromic material 10 and, consequently, reduce the glare of the high beams produced at least in part by the high-beam light source 4.

Due to the arrangement of the electrochromic material 10 in the electrochromic adaptive driving beam system in front of the high-beam light source 4, the electrochromic adaptive driving beam system of the present disclosure can reduce, or eliminate, the glare emitted by the high-beam light source 4 without interfering with other optics of the vehicle headlamp 2. For example, when a voltage is applied to the electrochromic material 10, the change in opacity will affect the light produced by the high-beam light source 4 without affecting the light produced by the low-beam light source 6. This allows the electrochromic material 10 to reduce the glare of the high beams such that other drivers will not be dazzled by the high beams.

Although FIG. 1 shows the electrochromic material 10 as extending perpendicular to the vehicle headlamp 2, the shape of the electrochromic material 10 is not particularly limited.

Figure 2:
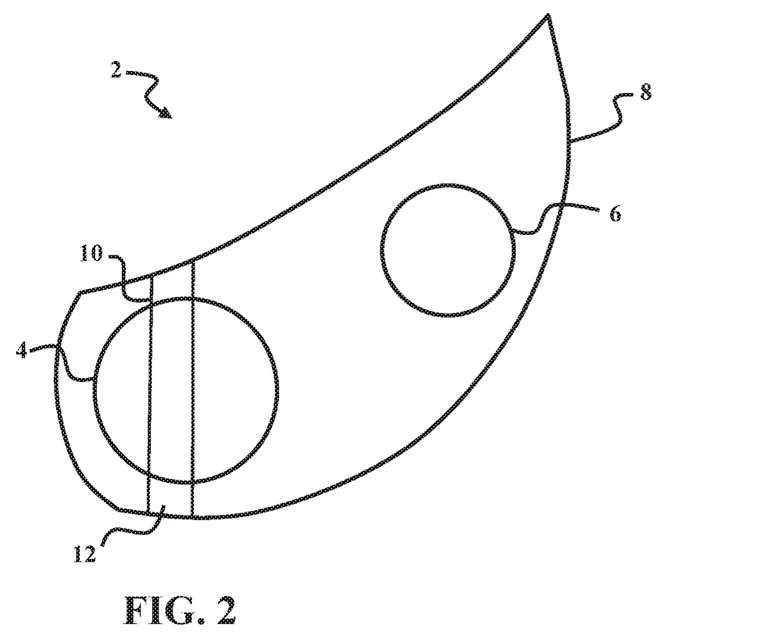
FIG. 2 is a schematic diagram of a vehicle headlamp with an electrochromic material, which is transparent in FIG. 2 according to disclosed embodiments.
Figure 3:
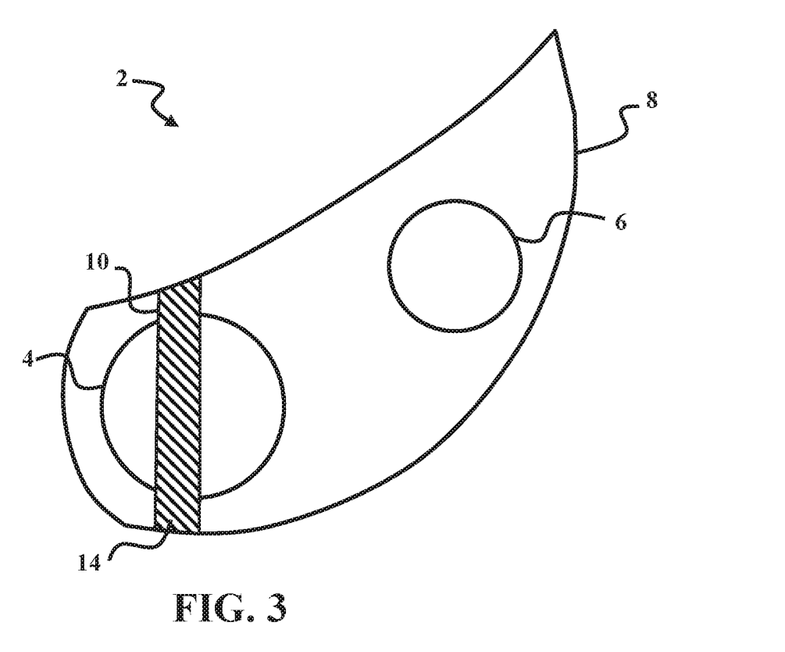
FIG. 3 is a schematic diagram of a vehicle headlamp with an electrochromic material that has changed opacity compared to FIG. 2 according to disclosed embodiments.

FIGS. 2 and 3 show a simplified depiction of the operation of the electrochromic material 10 in the electrochromic adaptive driving beam system. In particular, FIGS. 2 and 3 show a close-up, front view of a vehicle headlamp 2 with an electrochromic material 10 positioned in front of (e.g., within the optical projection path) of the high-beam light source 4.

FIG. 2 shows the electrochromic material 10 in an inactive, transparent state. That is, FIG. 2 shows an inactive electrochromic material 12 that is transparent. Since the inactive electrochromic material 12 is inactive, the high-beam light source 4 may optically form the high beams without interference.

FIG. 3 shows the electrochromic material in an active state. In particular, FIG. 3 shows an active electrochromic material 14. The electrochromic material 10 is no longer transparent when the electrochromic material 10 becomes an active electrochromic material 14 in response to a voltage. The opacity of the electrochromic material 10 in FIG. 3 has increased compared to the transparency of the electrochromic material 10 in FIG. 3.

The increased opacity of the electrochromic material 10 is depicted in FIGS. 2 and 3, and other the figures of the present application, as cross-hatching for illustrative purposes only. As noted above, an electrochromic material 10 changes from transparent to opaque due to a change in electron structure (e.g., ion flow) in response to an applied voltage.

Figure 4:
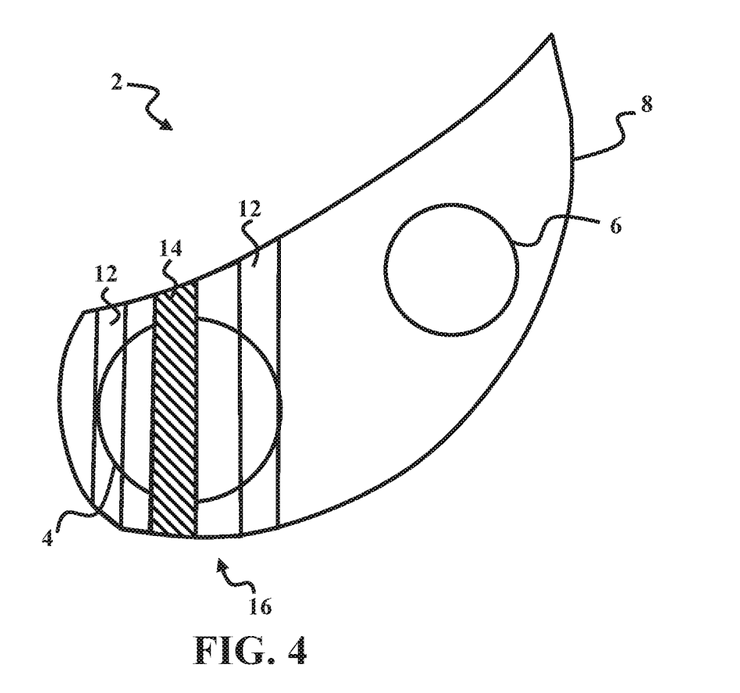
FIG. 4 is a schematic diagram of a vehicle headlamp with a plurality of electrochromic sections in which one of the electrochromic sections has changed opacity according to disclosed embodiments.
Figure 5:
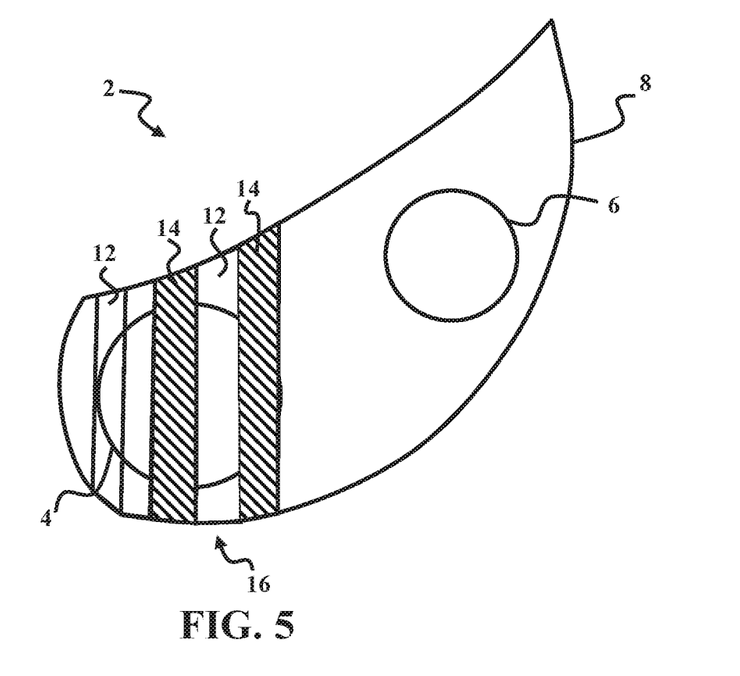
FIG. 5 is a schematic diagram of a vehicle headlamp with a plurality of electrochromic sections in which more than one of the electrochromic sections has changed opacity according to disclosed embodiments.

FIGS. 1-3 show the electrochromic material 10 as a single strip formed on the cover lens 8 across the high-beam light source 4. The electrochromic adaptive driving beam system may include more than one strip of electrochromic material 10. FIGS. 4 and 5 show the electrochromic adaptive driving beam system with multiple strips of electrochromic material 10, which are referred to as electrochromic material sections 16.

Each of the electrochromic material sections 16 may controlled independently from each other. For example, FIG. 4 depicts one section with an active electrochromic material 14, and several other sections with an inactive electrochromic material 12 (four inactive sections are shown in FIG. 4), and FIG. 5 shows two section of the electrochromic material sections 16 with active electrochromic material 14. The independently controllable sections of the electrochromic material sections 16 allows the change in opacity of the electrochromic material 10 to reduce the glare of the high beams and thus change the light pattern of the high beams. This is achieved by changing the opacity of electrochromic material 10 in front of the high-beam light source 4.

In FIGS. 4 and 5, the electrochromic material 10 is shown as parallel strips of electrochromic material sections 16. However, the electrochromic material 10 is not limited to this particular shape. For example, the electrochromic material sections 16 could be formed in a matrix shape in front of the high-beam light source 4.

As there are multiple electrochromic material sections 16, the electrochromic adaptive driving beam system may change sections of the electrochromic material sections 16 that correspond to the location of other vehicles or pedestrians, or both. The determination and control of the electrochromic material sections 16 corresponding to the location of detected objects is discussed in greater detail further below.

Figure 6:
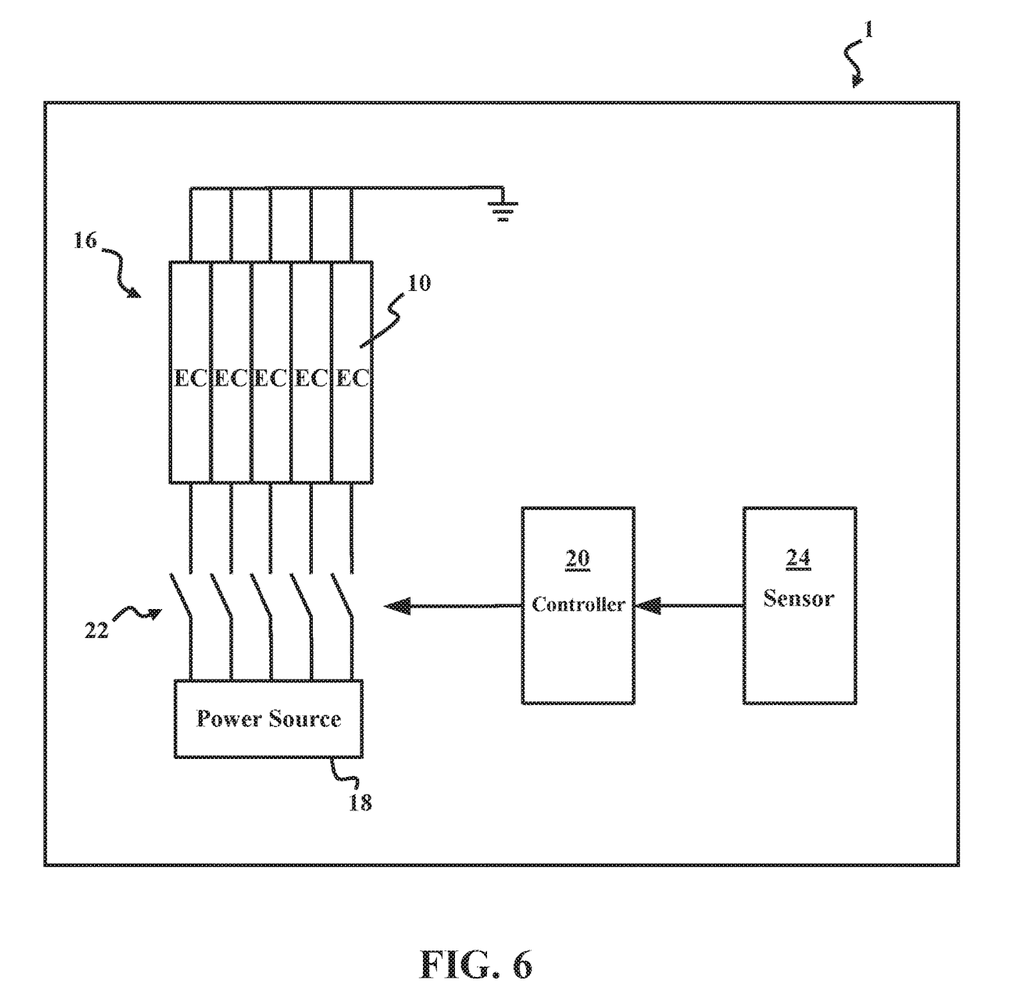
FIG. 6 is a schematic circuit diagram of a vehicle with a plurality of electrochromic sections in a vehicle headlamp according to disclosed embodiments.

FIG. 6 shows a symbolic control circuit for the electrochromic adaptive driving beam system. In the circuit diagram of FIG. 6, the electrochromic adaptive driving beam system includes a power source 18, a controller 20, switches 22, and a sensor 24. The switches 22 connect the electrochromic material 10 in each of the electrochromic material sections 16 to the power source 18 and ground. When the circuit is closed, this provides a potential difference across each of the electrochromic material sections 16. The potential difference is an applied voltage that causes the electrochromic material 10 to change opacity from, e.g., transparent to opaque.

The sensor 24 sends a detection signal to the controller 20. The controller 20 then processes the detection signal to determine which of the electrochromic material sections 16 to control with an applied voltage. After processing the detection signal, the controller 20 sends an operation signal to one or more of the switches 22. The switches 22 operate to activate (i.e., turn on) or inactivate (i.e., turn off) the electrochromic material 10 in the electrochromic material sections 16 by applying a voltage to one or more of the electrochromic material sections 16.

As noted above, the electrochromic material 10 changes opacity in response to a voltage. Hence, when the circuit in FIG. 6 is closed, the potential difference will cause the electrochromic material 10 to change opacity. As will be understood by one skilled in the art, the particular circuit configuration that applies the voltage to the electrochromic material 10 is not particularly limited. Any number of, e.g., conductors, electrodes, and ion layers may be provided so long as the electrochromic material 10 receives the applied voltage and undergoes a change in opacity in response to the applied voltage.

The sensor 24 may be one or more sensors. The sensor 24 may be a single sensor or a sensory cluster. The sensor 24 may be, or include, an electronic sensor that detects light, such as a photosensor. The sensor 24 may be, or also include, a camera in one or more embodiments. The sensor 24 and the controller 20 may be located, or distributed, throughout the vehicle 1.

The electrochromic material 10 of the electrochromic adaptive driving beam system may be formed in the material, or on a surface, of the optics in the vehicle headlamp 2. The optics of the vehicle headlamp 2 may include primary and secondary optics.

Primary optics refer to the initial optics that optically form light patterns from a light source. For example, light-emitting diodes ("LEDs") may include primary optics as a lens having a dome-shape, which is located on top of the LED. Secondary optics refer to other optics that help form light patterns from the light source. The secondary optics may be located outside of the primary optics, and the primary optics may be located between a light source and the secondary optics. The primary optics may be referred to as an inner lens, and the secondary optics may be referred to as an outer lens. FIGS. 2 and 3 show an example of the electrochromic material 10 on secondary optics. Examples of the electrochromic material 10 on primary optics are discussed below.

Figure 7:
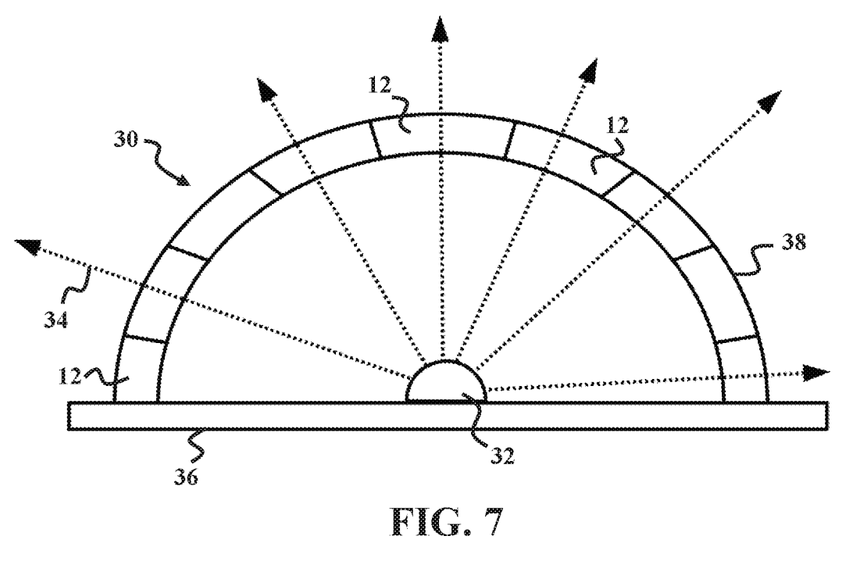
FIG. 7 is a cross-sectional schematic diagram of a high beam lens that is formed of an electrochromic material, which is transparent in FIG. 7 according to disclosed embodiments.
Figure 8:
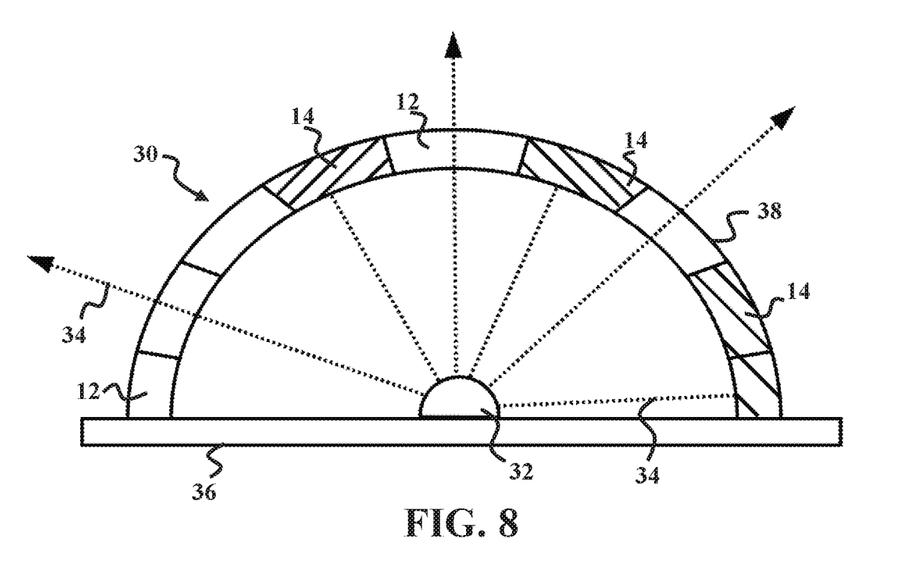
FIG. 8 is a cross-sectional schematic diagram of a high beam lens that is formed of an electrochromic material, which has changed opacity in FIG. 8 compared to FIG. 7 according to disclosed embodiments.

FIGS. 7 and 8 show an example of the electrochromic material 10 formed in the material of the primary optics of the high-beam light source 4 in the electrochromic adaptive driving system. In particular, FIGS. 7 and 8 show an electrochromic lens 30, which is the primary optics of a light source 32. The light source 32 is a part of the high-beam light source 4, which may include one or any number of light sources 23 individually.

As shown in FIGS. 7 and 8, the electrochromic adaptive driving beam system includes an electrochromic lens 30 that optically forms light rays 34 projected from the light source 32. The light source 32 is attached to a base 36 of the vehicle headlamp 2 in the figures for purposes of illustration. Other layers and substrates may be located between the base 36 of the vehicle headlamp 2 and these features. As the light source 32 is a part of the high-beam light source 4, the electrochromic lens 30 is a type of high beam lens 38 that includes electrochromic material 10.

As with the electrochromic material 10 discussed above, the electrochromic material 10 in the electrochromic lens 30 changes opacity in response to a voltage. The change in opacity of the electrochromic material 10 may be from transparent to opaque. FIG. 7 shows that the electrochromic material 10 of the electrochromic lens 30 as inactive electrochromic material 12. Thus, the electrochromic material 10 in the material of the electrochromic lens 30 is transparent in FIG. 7.

FIG. 8 shows a change in the opacity of the electrochromic material 10 in the electrochromic lens 30 that occurs after the voltage is applied. In particular, FIG. 8 shows that after the opacity changes, the electrochromic material 10 becomes an active electrochromic material 14. The active electrochromic material 14 blocks some of the light rays 34 projected from the light source 32.

Although FIG. 8 illustrates the active electrochromic material 14 completely blocking the light rays 34 projected from the light source 32, the active electrochromic material 14 may allow some of the light rays 34 to transmit through the active electrochromic material 14. This provides the ability to modulate the light rays 34 through control of the electrochromic material 10, and may provide a dimming effect of the high beams.

The electrochromic material 10 of the electrochromic adaptive driving beam system may be formed on a surface of a high beam lens 38 that does not include electrochromic material 10. That is, the electrochromic material 10 may coat, or cover, a surface of the high beam lens 38. For example, FIGS. 9 and 10 show an electrochromic coating 40 that is formed on (i.e., coats or applied to) an outer surface of a high beam lens 38.

Figure 9:
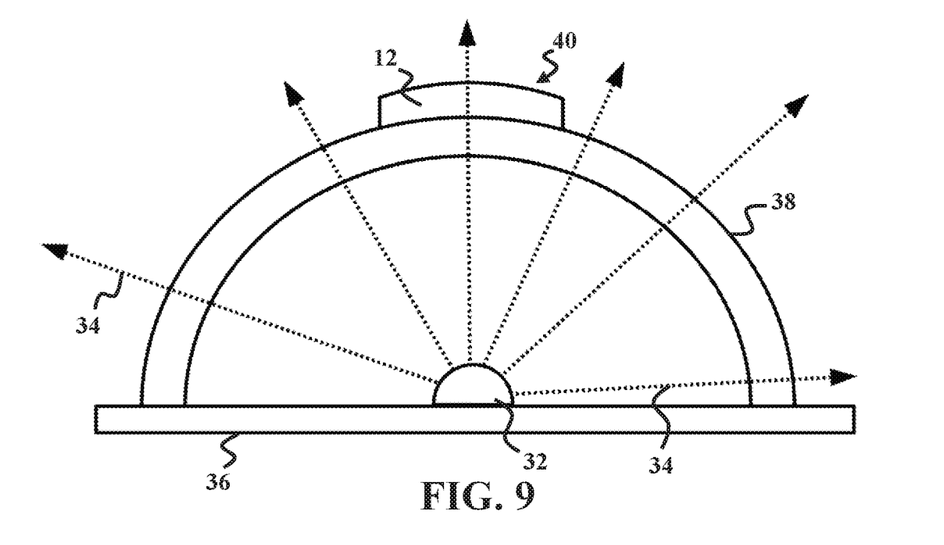
FIG. 9 is a cross-sectional schematic diagram of a cover that is formed of an electrochromic material, which is transparent in FIG. 9 according to disclosed embodiments.
Figure 10:
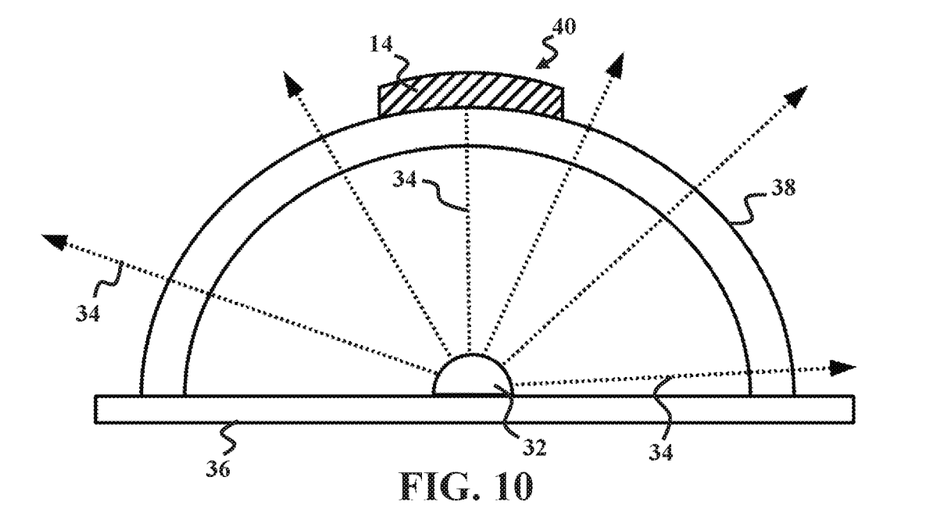
FIG. 10 is a cross-sectional schematic diagram of a cover that is formed of an electrochromic material, which has changed opacity in FIG. 10 compared to FIG. 9 according to disclosed embodiments.

Although the electrochromic material 10 coats an outer surface of the high beam lens 38 in FIGS. 9 and 10, this is only shown for illustrative purposes. The electrochromic coating 40 may be formed on an inner surface of the high beam lens 38. The inner surface and the outer surface of the high beam lens 38 are with respect to the proximity to the light source 32. Other coatings and layers may be provided.

Returning to FIGS. 9 and 10, the electrochromic material 10 of the electrochromic coating 40 in FIG. 9 is an inactive electrochromic material 12, and the electrochromic material 10 in FIG. 10 is an active electrochromic material 14. The inactive electrochromic material 12 in FIG. 9 is transparent, and thus light rays 34 projected from the light source 32 transmit through the high beam lens 38 and the electrochromic coating 40. The active electrochromic material 14 in FIG. 10 has changed opacity compared to the inactive electrochromic material 12. The change in opacity of the active electrochromic material 14 in the electrochromic coating 40 blocks the light rays 34 projected from the light source 32 that would otherwise transmit through the electrochromic coating 40.

As noted above, the electrochromic material 10 may coat, or cover, a lens of the vehicle headlamp 2. A electrochromic coating 40 is discussed above. To cover a lens of the vehicle headlamp, the electrochromic material 10 may be formed as an electrochromic cover 42. The electrochromic cover 42 covers the high-beam light source 4 of the vehicle headlamp 2. To do so, the electrochromic cover 42 may attach to the cover lens 8 of the vehicle, as shown in the electrochromic material 10 of FIG. 1. The electrochromic cover 42 may include one or more sections of electrochromic material 10.

Figure 11:
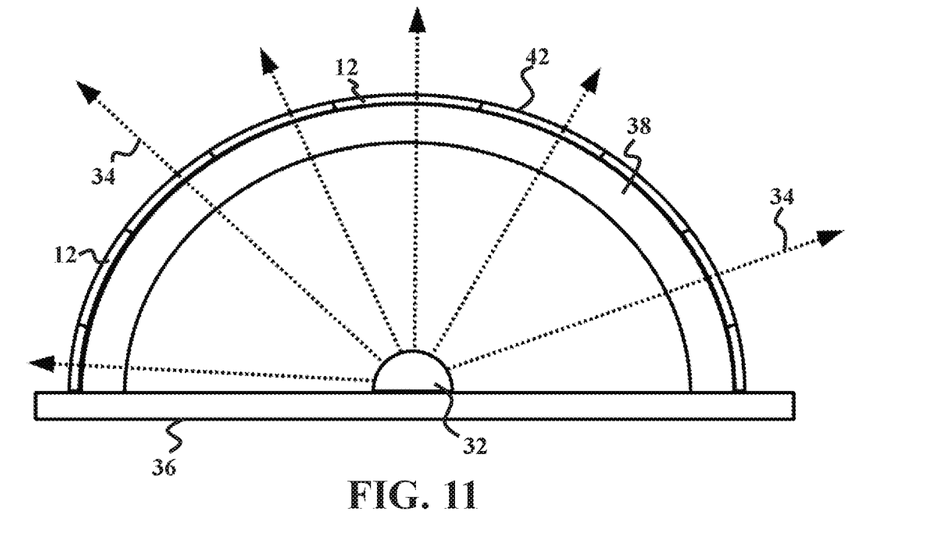
FIG. 11 is a cross-sectional schematic diagram of a cover that is formed of an electrochromic material, which is transparent in FIG. 11 according to disclosed embodiments.
Figure 12:
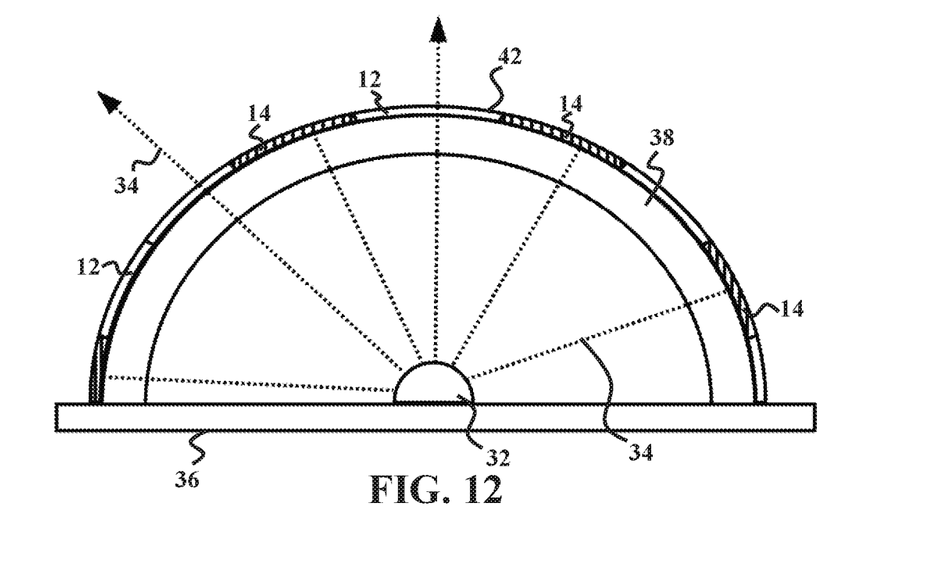
FIG. 12 is a cross-sectional schematic diagram of a cover that is formed of an electrochromic material, which has changed opacity in FIG. 12 compared to FIG. 11 according to disclosed embodiments.

To cover the high-beam light source 4, the electrochromic cover 42 may cover the high beam lens 38 by attaching to a surface of the high beam lens 38. For example, FIGS. 11 and 12 show an electrochromic cover 42 that is attached to a surface of the high beam lens 38. The electrochromic cover 42 in FIGS. 11 and 12 include different sections of electrochromic material 10, which are similar to the electrochromic material sections 16 discussed above in that they are independently controllable.

As shown in FIGS. 11 and 12, the electrochromic cover 42 includes inactive electrochromic material 12 in more than one section that is transparent. The transparency of the electrochromic material 10 allows light rays 34 projected from the light source 32 to transmit through the high beam lens 38 and the electrochromic cover 42.

FIG. 12 shows that one or more of the sections of electrochromic cover 42 may be activated to change opacity. The electrochromic cover 42 includes active electrochromic material 14, which has changed opacity after receiving an applied voltage. The active electrochromic material 14 thus blocks some of the light rays 34 projected from the light source 32.

The electrochromic material 10 of the electrochromic cover 42 is independently controllable. The electrochromic adaptive driving beam system may block part of the intensity of the high beams. This allows some of the light pattern to form so as not to completely block the light emitted from the vehicle headlamp 2.

Furthermore, the light rays 34 emitted from the high-beam light source 4 that would otherwise interfere with a neighboring vehicle or a pedestrian can be blocked by the electrochromic material 10.

Although FIGS. 9-12 depict the electrochromic material 10 formed on a surface of the high beam lens 38, the electrochromic material 10 can be attached to any surface or lens of the vehicle headlamp 2 in the electrochromic adaptive driving beam system. For example, the electrochromic material 10 can be attached as an electrochromic cover 42 to a surface of the cover lens 8. This may advantageously allow the electrochromic material 10 to be an after-market product for the vehicle 1 that does not involve partial, or complete, reconstruction of a factory headlamp in order to implement the electrochromic adaptive driving beam system.

The electrochromic material 10 of the electrochromic adaptive driving beam system is included within in the vehicle headlamp 2, and located at any position that allows the electrochromic material 10 to reduce the glare of the high-beam light source 4 of the vehicle headlamp 2. This allows the electrochromic adaptive driving beam system to reduce the glare and prevent high beams from dazzling other drivers or people.

Figure 13:
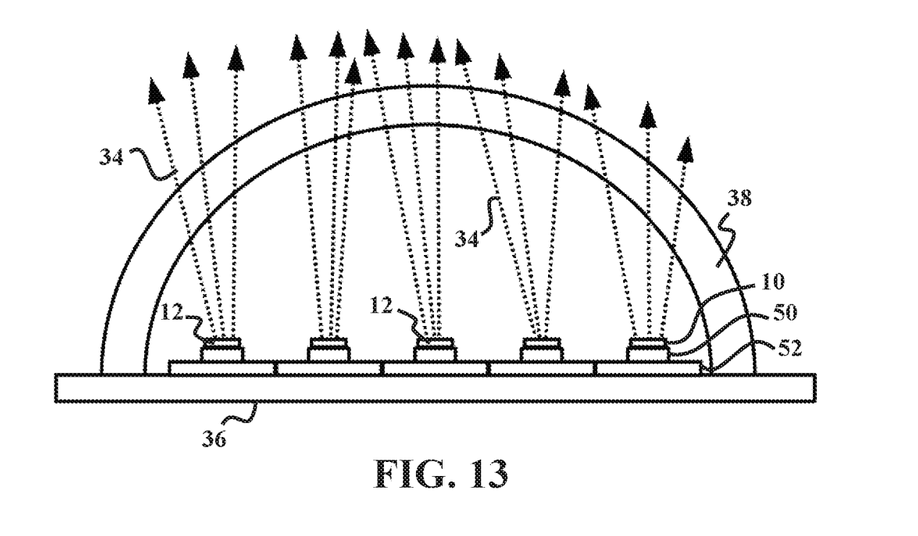
FIG. 13 is a cross-sectional schematic diagram of a cover that is formed of an electrochromic material attached to a high-beam light source according to disclosed embodiments.
Figure 14:
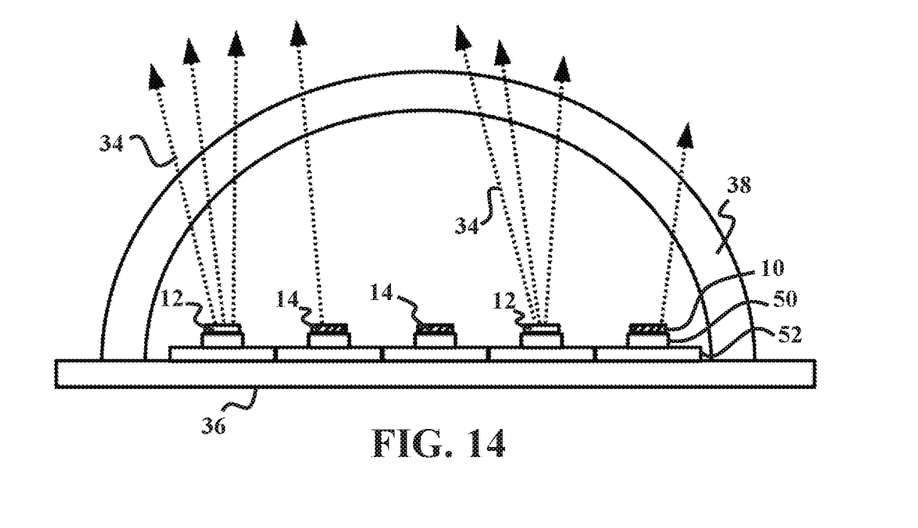
FIG. 14 is a cross-sectional schematic diagram of a cover that is formed of an electrochromic material and that is attached to a high-beam light source, which has changed opacity in FIG. 14 compared to FIG. 13 according to disclosed embodiments.

The electrochromic material 10 of the electrochromic adaptive driving beam system may be formed on a surface of the light source 32 itself. For example, FIGS. 13 and 14 show an example of the electrochromic material 10 formed on a surface of a light source 32. The electrochromic material 10 may be a coating applied to the light source 32 or a cover attached to a surface of the light source 32. The light source 32 in FIGS. 13 and 14 is shown as multiple light sources 32 that are light emitting devices 50.

FIGS. 13 and 14 show that the light emitting devices 50 are formed on a light emitting device board 52 (e.g., a printed circuit board). The electrochromic material 10 may be formed on, or in, a layer of the light emitting devices 50, as shown.

FIG. 13 shows that the electrochromic material 10 formed on the light emitting devices 50 is inactive. That is, the inactive electrochromic material 12 is not receiving a voltage. This allows the light rays 34 emitted from the light emitting devices 50 to transmit through the high beam lens 38.

The cross-hatching in FIG. 14 shows that a voltage has been applied to the electrochromic material 10 on more than one of the light emitting devices 50. In particular, the electrochromic material 10 has become an active electrochromic material 14, and thus light rays 34 emitted from the light emitting devices 50 are blocked in FIG. 14.

As shown in FIG. 14, the active electrochromic material 14 can block some or all of the light rays 34 emitted from one or more of the light emitting devices 50. That is, the electrochromic material 10 can either block all of the light rays 34 emitted from a particular light emitting device 50, or the electrochromic material 10 can only block some of the light rays 34. This is symbolically shown in FIGS. 13 and 14 as a reduction in the number of light rays 34. For example, FIGS. 13 and 14 show that two of the light rays 34 have been blocked and one of the light rays 34 remains that have been emitted from the light emitting devices 50 on the far right of FIGS. 13 and 13.

Figure 15:
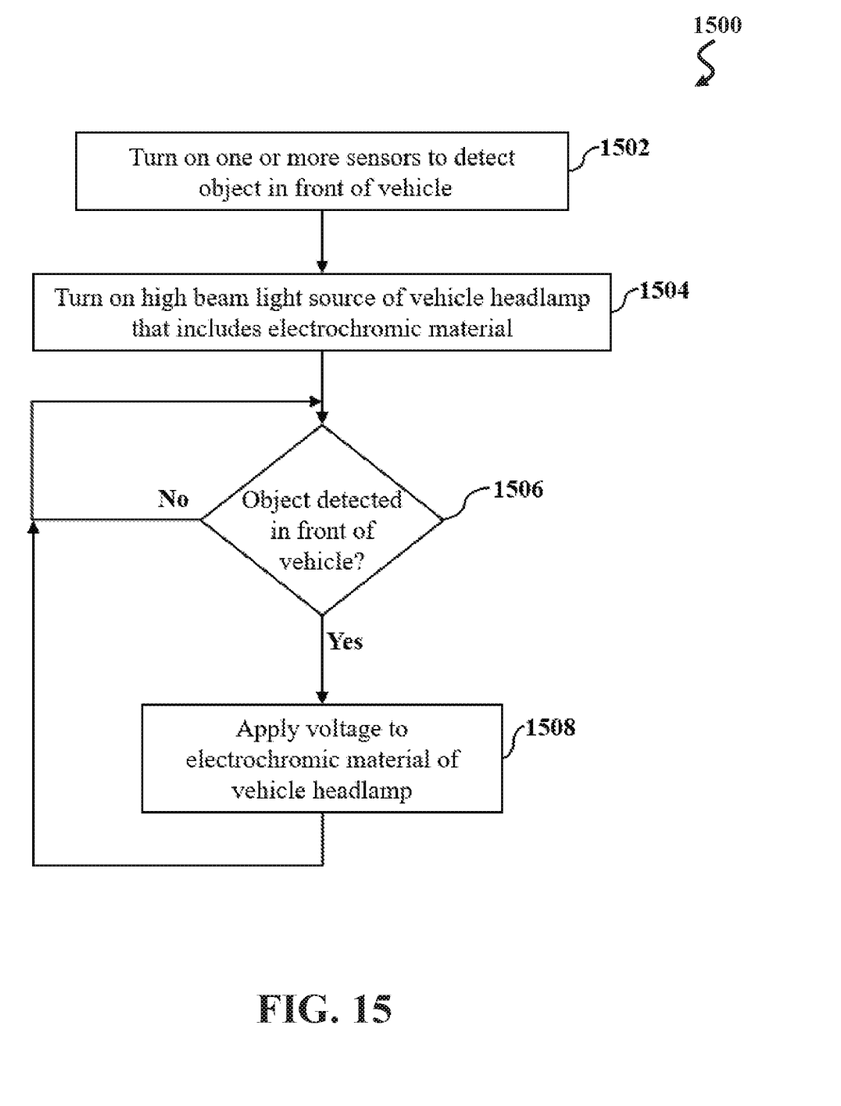
FIG. 15 is a flow chart showing a method of controlling an electrochromic adaptive driving beam system according to disclosed embodiments.
Figure 16:
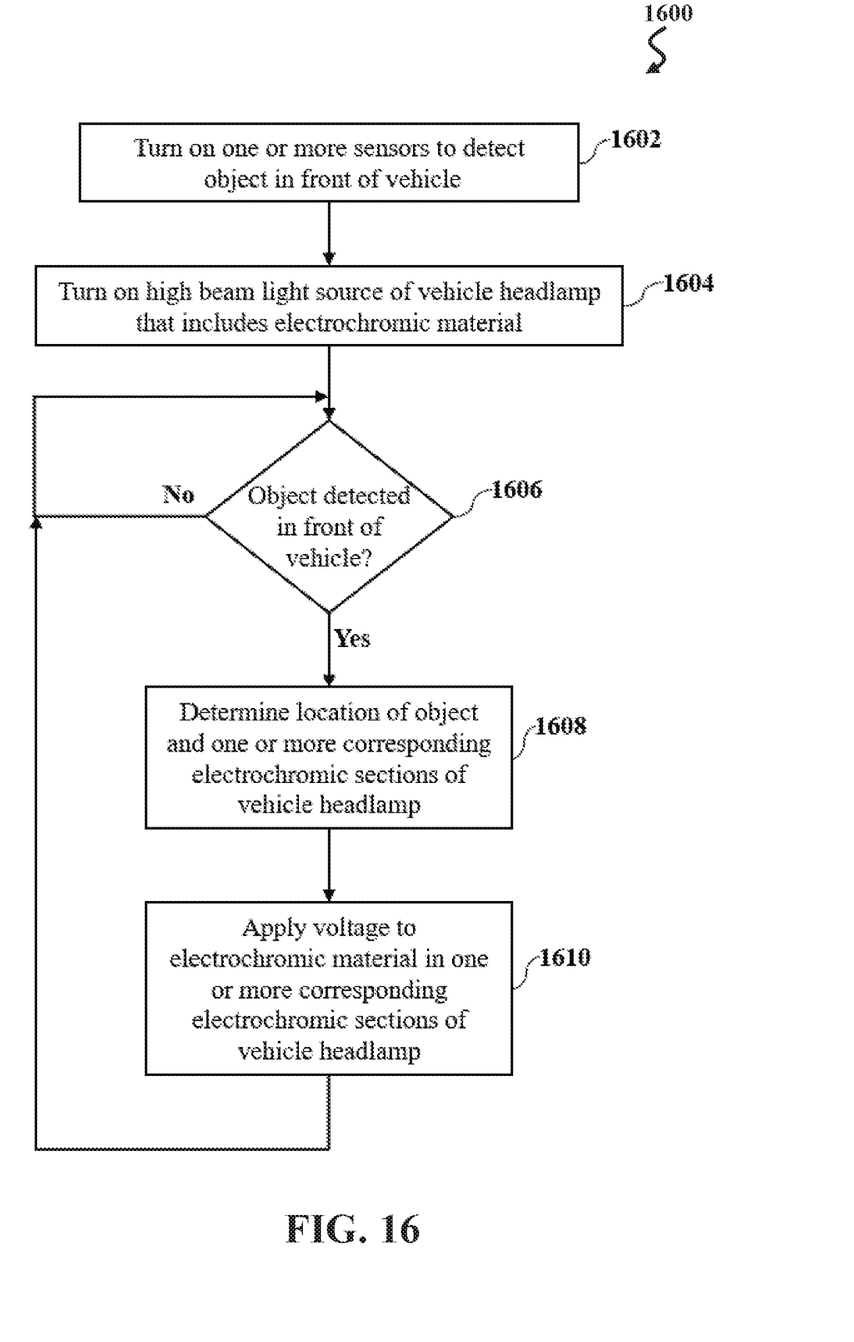
FIG. 16 is a flow chart showing a method of controlling an electrochromic adaptive driving beam system according to disclosed embodiments.

FIGS. 15 and 16 show flowcharts for controlling the electrochromic adaptive driving beam system. The flowchart 1500 and the flowchart 1600 in FIGS. 15 and 16, respectively, are applicable to controlling the electrochromic material 10 in the electrochromic adaptive driving beam system discussed above. The flowcharts allow the electrochromic adaptive driving beam system to reduce the glare of the high beams attributable to the high-beam light source 4 through control of the electrochromic material 10. Additional steps may be provided in the flowcharts.

The flowchart 1500 of FIG. 15 shows a step 1502 of turning on one or more sensors 24 to detect an object in front of the vehicle, and a step 1504 of turning on a high-beam light source 4 of a vehicle headlamp 2 that includes electrochromic material 10. The high beams of the vehicle headlamp 2 are formed at least in part by the high-beam light source 4. The turning on of the high-beam light source 4 and the sensors 21 in step 1502 and step 1504 can be performed in any order or at the same time.

The one or more sensors 24 turned on in step 1502 may be automatically turned on when the vehicle 1 turns on (e.g., ignition started in an automobile). Alternatively, the one or more sensors 21 may be turned on manually, or at a different time than, the vehicle 1. The same applies to turning on the high-beam light source 4 in step 1504.

The flowchart 1500 include includes a detection step in step 1506. In step 1506, processing is performed in a control loop (e.g., by a processor of the controller 20) to determine whether an object has been detected in front of the vehicle 1. The controller 20 processes a detection signal output from the sensor 24 to make this determination. The manner used to perform the detection in step 1506 is not particularly limited as will be understood by one skilled in the art.

The object detected in step 1506 could be, e.g., another vehicle or a pedestrian. By being in front of the vehicle 1, the object can be positioned in the path of the light pattern (i.e., that form a part of the high beams) projected by the high-beam light source 4.

If the controller 20 determines that an object is not in front of the vehicle 1, the control loop continuously repeats step 1506. If the controller 20 makes an affirmative determination that an object is in front of the vehicle 1 (i.e., the controller 20 detects an object), then the controller 20 applies a voltage to the electrochromic material 10. For example, the controller 20 transmits a control signal to the switches 22 to connect the electrochromic material 10 to the power source 18 in step 1508. This will activate the electrochromic material 10, and allow the active electrochromic material 14 to reduce the glare of the high beams of the vehicle headlamp 2.

After the voltage has been applied to the electrochromic material 10 in step 1508, the flowchart 1500 returns to step 1506. In step 1506, the controller determines whether the an object is in front of the vehicle. If an object is not detected, or no longer detected, the controller makes a negative determination. When the controller 20 makes a negative determination (i.e., "no" in flowchart 1500), the controller 20 also stops applying the voltage to the electrochromic material 10 if the voltage was applied in step 1508.

As noted above, the electrochromic material 10 may be formed in electrochromic material sections 16, which are independently controllable. The controller 20 may be configured to determine the location of an object and the corresponding section of the electrochromic material 10. The controller 20 may then selectively apply a voltage to one or more of the electrochromic material sections 16 that are responsible for the portion of the high beams that intersect the object. FIG. 16 shows a flowchart 1600 that demonstrates this process.

In step 1602 of the flowchart 1600 in FIG. 16, one or more sensors 24 turn on to detect an object in front of the vehicle 1. In step 1604, the high-beam light source turns on in a vehicle headlamp 2 that includes an electrochromic material 10. Like step 1502 and step 1604 in flowchart 1500 of FIG. 15, step 1602 and step 1604 in flowchart 1600 of FIG. 16 can be performed in any order or simultaneously. Furthermore, in step 1606, the controller 20 determines whether an object is in front of a vehicle in a similar manner as step 1506.

In step 1608, the controller 20 determines the location of the object in front of the vehicle 1. The controller 20 also determines which one or more of the electrochromic material sections 16 corresponds to the location of the object in front of the vehicle 1. That is, the controller 20 determines which one or more of the electrochromic material sections 16 forms the part of the high beam light pattern that will intercept the object.

The determination of the location of the object and the determination of which one or more of the electrochromic material sections 16 in step 1608 can be performed in one or multiple steps. For example, the memory of the controller 20 may indicate which of the electrochromic material sections 16 is responsible for which part of the light pattern projected by the high-beam light source 4. In processing the detection signal from the sensor 24, the processor of the controller 20 may identify which of the electrochromic material sections 16 corresponds to the location of the object that has been detected. After this determination, the controller 20 may send a control signal to control the switches 22 corresponding to one or more electrochromic material sections 16.

In step 1610, the controller 20 applies a voltage to the electrochromic material 10 that has been determined to correspond to the location of the object. For example, the controller 20 can send a control signal to one or more of the switches 22 in FIG. 6 to selectively control the voltage applied to the electrochromic material 10. This causes some of the electrochromic material 10 to become active electrochromic material and block light rays 34, as discussed in greater detail above.

After the voltage has been applied in step 1610, the controller 20 determines whether an object is still present in front of the vehicle, which is shown in the feedback loop to step 1606 in flowchart 1600. Like step 1506, the controller 20 can turn off (stop) the voltage from being applied to the electrochromic material 10 if no object is detected (i.e., "no" in flowchart 1600).

As will be understood by one skilled in the art, the electrochromic adaptive driving beam system and method may include one or more of each of the components discussed above. For example, as discussed above, the number and type of light sources is not particularly limited. Furthermore, the electrochromic adaptive driving beam system and method may include, or be performed by, one or more controllers 20.

As another example of additional components, the electrochromic adaptive driving beam system may further include an additional adaptive driving beam mechanism that are provided as a redundancy for the beam control of the vehicle headlamp 2 using the electrochromic material 10. In this same regard, the electrochromic adaptive driving beam system may be combined with other adaptive driving beam systems that, e.g., do not include an electrochromic material 10.

The controller 20 discussed above may include one or more processors and memory. The controller 20 may be, or include, e.g., a microcontroller, a microcomputer, or a digital signal processor. The memory can include static memory (e.g., ROM, PROM, EPROM), dynamic memory (e.g., RAM, SRAM, DRAM), and/or hybrid memory (e.g., NVRAM, EEPROM, Flash) that holds information used by the controller 20. The memory of the controller 20 can include one or more programs for operating the components of the electrochromic adaptive driving beam system and method, data used by the controller 20, and/or technical information used by the controller 20. In various embodiments, the memory of the controller 20 may include, or be, a flash drive, a solid-state drive, a magnetic or optical drive, or any suitable memory device.

This disclosure is intended to explain how to fashion and use various embodiments in accordance with, not limit. the true, intended, and fair scope and spirit thereof. The foregoing description is not intended to be exhaustive, or limited to, the precise form disclosed. Modifications or variations are possible in light of the above teachings. The embodiments above are chosen and described to provide illustration of the principles as practical applications, and to enable one of ordinary skill in the art to utilize the various embodiments and with various modifications as are suited to the particular use contemplated. All such modifications and variations are within the scope of the disclosure as determined by the appended claims, as may be amended during the pendency of this application for patent, and all equivalents thereof, when interpreted in accordance with the breadth to which they are fairly, legally, and equitably entitled.

What is claimed:

1. An electrochromic adaptive driving beam system for a vehicle, comprising:
   a vehicle headlamp that includes a base, a cover lens attached to the base, and an electrochromic material;
   a high-beam light source attached to the base of the vehicle headlamp, housed within the cover lens, and physically covered by the electrochromic material of the vehicle headlamp; and
   a low-beam light source attached to the base of the vehicle headlamp, housed within the cover lens, and not physically covered by the electrochromic material of the vehicle headlamp, wherein
   the electrochromic material is transparent to transmit light projected from the high-beam light source and changes opacity to reduce glare projected from the high-beam light source through the vehicle headlamp in response to a voltage.

2. The electrochromic adaptive driving beam system according to claim 1, wherein
   the electrochromic material includes a plurality of electrochromic sections that each change opacity independently from each other.

3. The electrochromic adaptive driving beam system according to claim 1, wherein
   the electrochromic material coats a surface of the cover lens of the vehicle headlamp.

4. The electrochromic adaptive driving beam system according to claim 1, wherein
   the high-beam light source includes a high beam lens located between the cover lens and the base of the vehicle headlamp.

5. The electrochromic adaptive driving beam system according to claim 4, wherein
   the electrochromic material coats a surface of the high beam lens of the high-beam light source.

6. The electrochromic adaptive driving beam system according to claim 4, wherein
   the high beam lens of the high-beam light source is formed of the electrochromic material.

7. The electrochromic adaptive driving beam system according to claim 1, wherein
   the cover lens of the vehicle headlamp is formed of the electrochromic material.

8. The electrochromic adaptive driving beam system according to claim 1, further comprising
   an electrochromic cover that includes the electrochromic material, wherein the electrochromic cover attaches to a surface of the cover lens of the vehicle headlamp.

9. The electrochromic adaptive driving beam system according to claim 4, further comprising
an electrochromic cover that includes the electrochromic material, wherein the electrochromic cover attaches to a surface of the high beam lens of the high-beam light source.

10. The electrochromic adaptive driving beam system according to claim 1, further comprising
an electrochromic cover that includes the electrochromic material, wherein
the electrochromic cover attaches to the high-beam light source.

11. The electrochromic adaptive driving beam system according to claim 1, wherein the electrochromic material coats the high-beam light source.

12. The electrochromic adaptive driving beam system according to claim 1, further comprising
one or more sensors configured to detect an object in front of the vehicle headlamp and output a detection signal, and
a controller configured to apply the voltage to the electrochromic material in response to receiving the detection signal from the one or more sensors.

13. The electrochromic adaptive driving beam system according to claim 2, further comprising
one or more sensors configured to detect an object in front of the vehicle headlamp and output a detection signal, and
a controller configured to apply the voltage to the electrochromic material in one or more of the plurality of electrochromic sections in response to receiving the detection signal from the one or more sensors.

* * * * *